United States Patent [19] [11] 3,713,042
Kinsel [45] Jan. 23, 1973

[54] STABILIZED MODE-LOCKED LASER ARRANGEMENT
[75] Inventor: Tracy Stewart Kinsel, Martinsville, N.J.
[73] Assignee: Bell Telephone Laboratories Incorporated, Murray Hill, N.J.
[22] Filed: May 27, 1971
[21] Appl. No.: 147,328

[52] U.S. Cl. ............................331/94.5, 350/160
[51] Int. Cl. ........................................H01s 3/10
[58] Field of Search ..............331/94.5; 350/160

[56] References Cited

UNITED STATES PATENTS 3,432,770   3/1969   Massey ..........................331/94.5
3,534,292   10/1970  Cutler ...........................331/94.5
3,648,193   3/1972   Foster et al ....................331/94.5
3,471,803   10/1969  Forster .........................331/94.5

Primary Examiner—William L. Sikes
Attorney—R. J. Guenther and Kenneth B. Hamlin

[57] ABSTRACT

A dither technique is embodied in an auxiliary feedback loop of a mode-locked laser which includes a main feedback loop. An error-control signal is generated in the auxiliary loop in response to the occurrence in the laser system of various types of perturbations such as, for example, cavity length changes. This error signal is applied to the main loop to restore the operating point of the laser to the midpoint of the range in which mode-locked operation occurs. In this way the laser is positively controlled to exhibit a stable mode-locked behavior over a long period of time despite the occurrence of perturbations that might otherwise cause the operating point of the laser to extend outside the mode-locked range.

9 Claims, 4 Drawing Figures

STABILIZED MODE-LOCKED LASER ARRANGEMENT

BACKGROUND OF THE INVENTION

1. Field of the Invention

This invention relates to signal translation and more particularly to stabilized mode-locked laser arrangements.

2. Description of the Prior Art

It is known to operate a multi-axial-mode laser arrangement in a mode-locked manner. This may be accomplished, for example, by driving an intracavity phase modulator of the arrangement by means of an external signal generator at or near the frequency which corresponds to the average axial-mode spacing of the arrangement. (This frequency is $c/2L$, where $c$ is the speed of light and $L$ is the length of the laser cavity.) Such an externally-applied modulating signal introduces in the arrangement a time-varying perturbation which establishes a phase relationship between the oscillatory laser modes. As a result, the output of the laser is a periodic pulse train whose repetition rate is equal to the frequency of the external signal generator.

The neodymium-containing yttrium aluminum garnet (Nd:YAlG) laser developed by J. E. Geusic and L. G. Van Uitert (see U.S. Pat. No. 3,255,103, issued May 17, 1966) is an advantageous solid-state laser capable of continuous room temperature operation. For several reasons mode-locked operation of the Nd:YAlG laser is particularly desirable. First, mode-locking reduces the magnitude of the relaxation oscillations that may be present in the output of the Nd:YAlG laser. Such oscillations constitute a noise component whose presence is not desired. Second, the random phase variations observed in an unlocked Nd:YAlG laser give rise to large random variations in the average second harmonic power capable of being generated by such a laser. (The Nd:YAlG laser can be adapted to generate a second harmonic output by combining therewith a nonlinear optical material such as $Ba_2NaNb_5O_{15}$. For a description of such a combination see "Continuous $0.532\mu$ Solid State Source Using $Ba_2NaNb_5O_{15}$," by J. E. Geusic, H. J. Levinstein, S. Singh, R. G. Smith and L. G. Van Uitert, Applied Physics Letters, May 1968, pages 306–308.) Mode-locking of an Nd:YAlG laser operating as a second harmonic generator results in an almost-constant second harmonic power output therefrom.

Mode-locking a laser by means of an externally applied modulating signal presents problems of long term stability. This is due to the fact that the $c/2L$ frequency of the laser and the frequency of the external signal must be synchronized. Any drifting of the external signal and/or changes in the length of the laser cavity can cause the two noted frequencies to fall out of synchronism whereby the laser will no longer exhibit a mode-locked behavior.

One approach to stabilizing the mode-locked operation of a laser is to detect the beats between axial modes thereof and to use this signal (at a frequency of $c/2L$) in a feedback loop that is coupled to the intracavity modulator. This arrangement operates as a feedback regenerative oscillator when the gain in the loop is sufficiently high to exceed the losses therein and when the phase shift in the loop is a multiple of 360°. In this way the laser supplies its own drive frequency for mode-locking.

A variant of the oscillator-loop technique is to form a servo loop in which an error signal is generated by the phase shift of the output pulses to correct the output frequency of an external generator that is arranged to drive The the modulator. This configuration is in essence that of the well known phase-locked loop which is described, for example, in "Properties and Design of the Phase-Controlled Oscillator with a Saw-Tooth Comparator" by C. J. Byrne, The Bell System Technical Journal, March 1962, pages 559–602.

To mode-lock some lasers, it is sufficient to propagate in the feedback loop a signal at the average mode spacing or $c/2L$ frequency. This approach, as applied to a helium-neon laser, is described in "Mode-Locking of CW Lasers by Regenerative RF Feedback Loop," by G. R. Hugget, Applied Physics Letters, Sept. 1, 1968, pages 186–187. However, for a laser such as the Nd:YAlG one, there exists a phase instability in the mode-locked pulse train output thereof. More specifically, one output pulse train from the laser passes through the intracavity modulator when the phase retardation of the modulator is maximum whereas at other times an output train passes through the modulator when its retardation is minimum. These trains are displaced from each other by 180°. The laser jumps at random from one of these output conditions to the other and shows no apparent preference for either of them. As a result of these random phase fluctuations, the preset phase relationships established in the aforedescribed feedback loops are altered. As a consequence an Nd:YAlG laser arrangement fluctuates between stable and unstable operating conditions, which renders the arrangement unsuitable for many applications of practical interest.

My copending application, Ser. No. 827,817, filed May 26, 1969, is directed to achieving mode-locked operation of an Nd:YAlG laser despite the noted phase-instability characteristic. Moreover, a copending application of H. Seidel, Ser. No. 868,149, filed Oct. 21, 1969, describes a unique technique for eliminating entirely the random phase fluctuations in the output of such a laser.

Feedback control of the type described above is effective as a practical matter to achieve stable mode-locked operation of a laser system over a finite range of absolute phase values (in the case of an oscillator loop) or over a finite range of error signals (servo loop). But various gross perturbations in the system, for example large variations in cavity length or changes in component values, can in time cause the system parameters to change to such an extent that the phase or error-signal values in the feedback loop extend outside the noted ranges. In such a case stable mode-locked operation of the system ceases.

As the phase or error-signal values in the feedback loop of a mode-locked laser start to drift from a central initially-established point within the operating range, it would be desirable to apply a control or compensating signal to the loop to restore operation to or near the central point. But no suitable technique has been suggested heretofore for supplying such a signal.

SUMMARY OF THE INVENTION

Accordingly, an object of the present invention is an improved laser arrangement.

More specifically, an object of this invention is a feedback-stabilized mode-locked laser arrangement of the Nd:YAlG type.

Briefly stated, these and other objects of the present invention are realized in a specific illustrative embodiment thereof which comprises an Nd:YAlG laser arrangement including an intracavity phase modulator. Mode-locking of the laser is achieved by driving the modulator at a fundamental frequency that corresponds to the average axial-mode spacing of the laser. This driving signal is extracted from the output of the laser and applied to the modulator via a main feedback loop which, for example, is of the oscillator type. The parameters of the main loop are adjusted initially so that the operating point of the arrangement is established to correspond to a phase shift in the loop of an integral multiple of 360°. When the main loop is so adjusted, the arrangement will operate in a mode-locked manner even if some minor deviations occur in the initially-established phase condition. To maintain the operating point of the arrangement close to or at the initially-established point, a so-called dither (low frequency) signal is applied to the main loop to control a specified parameter thereof. Any signal component at the dither frequency appearing in the output of the laser is applied to an auxiliary feedback loop. The amplitude and phase of the dither signal are representative respectively of the amount and direction of the drift of the arrangement from the initially-established operating point. Accordingly, the dither signal is utilized to vary the appropriate parameter (for example, phase) in the main feedback loop to compensate exactly for any drift that has occurred in the arrangement. Thus the arrangement is maintained at or near the initially-established operating point in the middle of the range in which mode-locked operation can occur. In this way automatic long-term stabilization of the arrangement is achieved.

It is therefore a feature of the present invention that a low frequency error-control signal, generated in an auxiliary feedback loop of a mode-locked laser arrangement, be applied to a main feedback loop (of the oscillator or servo type) to maintain the operating point of the arrangement at or close to the midpoint of the range in which mode-locked operation occurs.

BRIEF DESCRIPTION OF THE DRAWING

A complete understanding of the present invention and of the above and other objects, features and advantages thereof may be gained from a consideration of the following detailed description of several specific illustrative embodiments thereof presented hereinbelow in connection with the accompanying drawing, in which.

DETAILED DESCRIPTION

Figure 1:
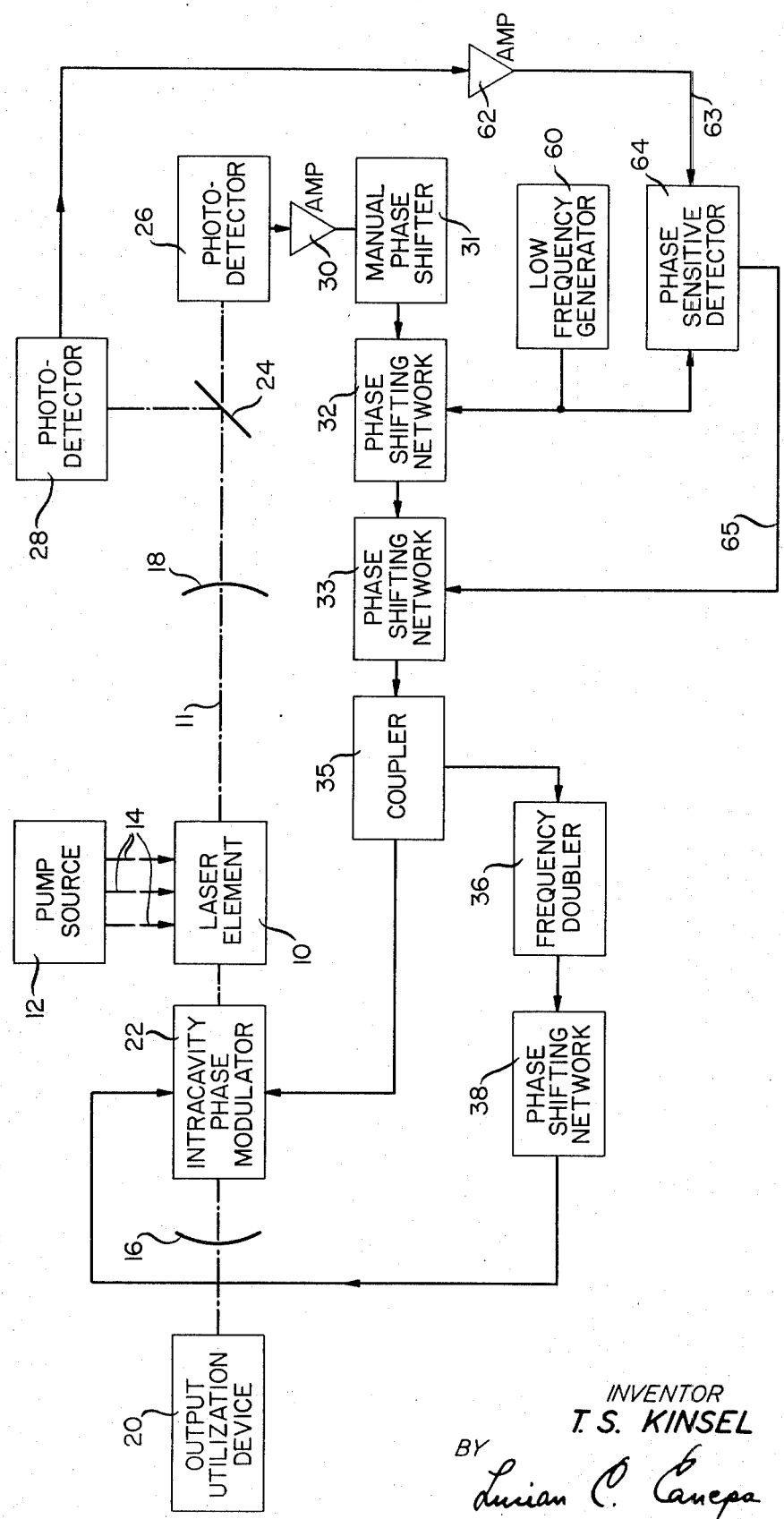
FIGS. 1 and 2 respectively show specific illustrative embodiments made in accordance with the principles of the present invention.

The specific illustrative laser arrangement shown in FIG. 1 includes a conventional laser element 10 which may, for example, comprise an Nd:YAlG rod of the type described in the aforecited Geusic-Van Uitert patent. Illustratively, the element 10 is a cylindrical rod whose main axis is coincident with the longitudinal axis 11 (dot-dash line) of the laser arrangement. Typically, the ends of the laser element 10 are flat, parallel and coated to be antireflective at a wavelength of 1.06 microns. Continuous pumping of the element 10 to achieve an output at 1.06 microns is achieved by means of a conventional pump source 12 whose radiant output, directed at the element 10, is represented by dashed arrows 14.

The laser element 10 of FIG. 1 is contained in a cavity defined by members 16 and 18. Illustratively, the member 16 is curved and selected to transmit to an output utilization device about 1.5 percent of the 1.06-micron radiation that impinges on the concave side thereof. (The remainder of this incident radiation is reflected to the right along the longitudinal axis 11.) The device 20 may, for example, comprise a workpiece such as a thin-film resistor whose characteristics are to be precisely controlled by laser micromachining techniques. For such purposes either the laser arrangement or the workpiece of both may be moved by conventional micropositioning apparatus (not shown).

Moreover, because of the unique stabilization techniques described herein, the laser signals directed at the output device 20 are characterized by a high degree of long-term stability and are, accordingly, well suited to be utilized in an optical communication system, for example a system of the pulse code modulation (PCM) type. Hence the device 20 may comprise a component of such a system.

Illustratively, the member 18 shown in FIG. 1 is also curved and selected to reflect all but a relatively small portion of the radiation directed at the concave side thereof. In one specific arrangement, the member 18 is adapted to transmit about 0.5 percent of the incident radiation. In turn, the laser signals transmitted through the member 18 are directed by a conventional beam splitter 24 to photodetectors 26 and 28.

A multi-axial-mode Nd:YAlG laser can be mode-locked thereby to provide an output that comprises a series of very narrow spaced-apart pulses. (In this connection, see "Generation of Ultrashort Optical Pulses by Mode Locking in the Nd:YAlG Laser," by M. DiDomenico, Jr., J. E. Geusic, H. M. Marcos and R. G. Smith, Applied Physics Letters, April 1966, pages 180–183.) Illustratively, mode-locked operation of the laser shown in FIG. 1 can be achieved by positioning a conventional phase modulator 22 (for example an element made of lithium niobate) in the laser cavity in the path of the beam that propagates along the axis 11. In particular, mode-locking is achieved by driving the modulator 22 with a signal whose frequency is at or near the average axial-mode spacing of the laser. This frequency may lie anywhere within the so-called phase-locked region of the laser. In this region the output of the laser is a time-dependent series of pulses. This region is approximately centered about a frequency of $c/2L$, which for illustrative purposes is assumed herein to be 300MHz. In FIG. 1, L, about 50 centimeters, is measured along the axis 11 and is the distance between the members 16 and 18.

An external signal generator (not shown) can be utilized to drive the modulator 22 shown in FIG. 1. It is advantageous, however, to configure the laser arrangement to supply its own modulating signal for mode-locking. Thus, as shown in FIG. 1, that portion of the output of the laser that is transmitted through the member 18 is applied to a feedback oscillator loop which is coupled to the modulator 22. This loop comprises the photodetector 26, an amplifier 30, phase shifting networks 31 through 33 and a coupler 35, all of which are conventional components. The phase shifting networks 32 and 33 each provide a phase shift which can be changed by applying a control voltage thereto.

It is known that the gain in the oscillator feedback loop must be selected to be sufficiently high to exceed the losses therein and that the phase shift around the loop must be adjusted to be a multiple of 360°. In this way the modulating signal and the 1.06-micron laser signals are synchronized.

To mode-lock some lasers, it is sufficient to propagate in the feedback oscillator loop a signal at the average mode-spacing or $c/2L$ frequency. This approach, as applied to a helium-neon laser, is described in the aforecited article by Hugget. However, for a laser such as the Nd:YAlG one illustratively described herein, there exists a phase instability in the mode-locked pulse-train output thereof. An advantageous technique for avoiding this instability in the output of such a laser is described in the aforecited Seidel application. As set forth there, a laser is phase-modulated by driving the intracavity modulator element at the $c/2L$ frequency (for example 300 MHz) and, simultaneously, at the second harmonic $cc/L$ frequency (600 MHz).

The aforementioned Seidel technique is embodied in the illustrative arrangement shown in FIG. 1. The 600 MHz signal to be applied to the modulator 22 is obtained by applying a portion of the 300 MHz signal propagated to the coupler 35 through a conventional frequency doubler 36 and another phase-shifting network 38. The network 38 allows the phase of the 600 MHz signals to be adjusted relative to the phase of the 300 MHz signals applied to the intracavity modulator 22. In practice, the phase shift introduced by the network 38 is varied until the afore-described phase-shift-switching phenomenon in the laser output is quenched. In accomplishing this result it has been observed that the relative amplitudes of the 300 and 600 MHz signals are not critical.

Ideally, once the oscillator loop of a mode-locked laser is adjusted as specified, the laser should remain in the mode-locked state even if the laser cavity is subjected to mechanical and thermal perturbations. As a practical matter, however, such feedback control is effective to achieve stable mode-locked operation only over a finite range of phase values (for an oscillator loop) or over a finite range of error signals (servo loop). Various perturbations in the laser arrangement can in time cause the phase or error-signal values in the feedback loops to extend outside the noted ranges. If that occurs, mode-locked operation ceases.

Figure 3:
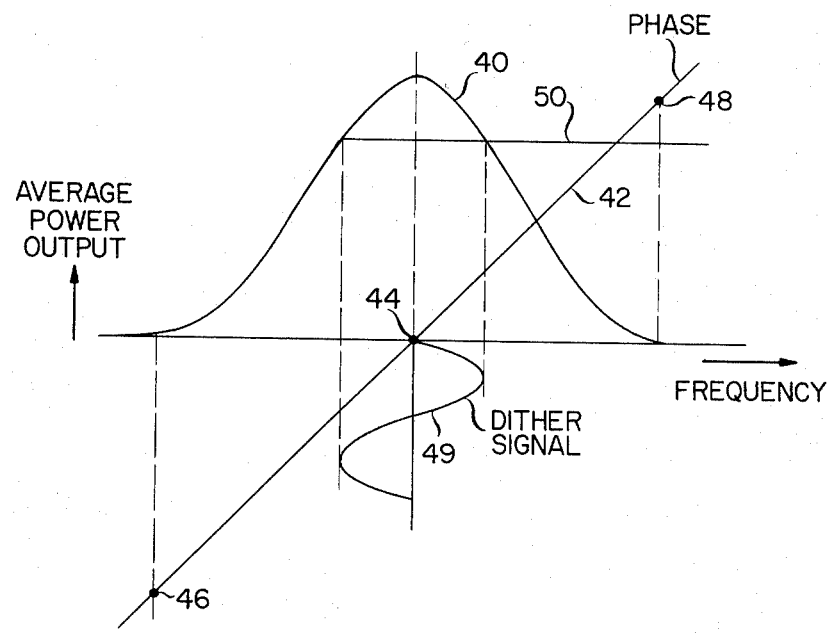
FIGS. 3 and 4 show waveforms that are helpful in understanding the mode of operation of the embodiments of FIGS. 1 and 2.

FIG. 3 includes a curve 40 that represents as a function of frequency the average output power of the mode-locked laser signals directed at the beam splitter 24 of FIG. 1. FIG. 3 also includes a line 42 that represents in effect the phase range over which mode-locked operation can occur with an oscillator feedback loop. When the phase shift around the loop is exactly an integral multiple of 360°, the phase condition of the loop is represented by point 44. This is the so-called midpoint of the range in which mode-locked operation can occur. This initially established point corresponds to maximum pulse power being delivered to the beam splitter 24 of FIG. 1. If, due to perturbations in the laser arrangement, the effective phase shift around the feedback loop deviates from the initially establishes point, a point other than the point 44 on the line 42 will represent the phase condition of the arrangement. As long as the new phase condition is represented by a point in the range between points 46 and 48 on the line 42, the laser will continue to operate in its mode-locked manner (but at a reduced output power level). But any perturbation that causes the phase condition of the arrangement to extend outside that range will lead to cessation of mode-locked operation.

In accordance with the principles of the present invention, a low frequency signal (illustratively one at 25 Hz) is introduced into the oscillator feedback loop shown in FIG. 1. This low frequency or dither signal is supplied by a highly-stable generator 60 and is introduced, for example, as a 25 Hz variation in the phase around the loop by applying the signal to the phase-shifting network 32.

A component at the dither frequency will not appear in the laser output directed at the beam splitter 24 (FIG. 1) if the arrangement is operating at the initially-established phase condition indicated by the point 44 (FIG. 3). This is evident by projecting dither signal 49 onto the characteristic curve 40 in FIG. 3 and observing that the resulting projection onto axis 50 has a signal component at twice the dither frequency but not at the dither frequency itself. In that case no correction signal is propagated in the auxiliary feedback loop that comprises the photodetector 28 and amplifier 62. As a result no signal is applied via lead 63 to a conventional phase-sensitive detector 64. Hence the detector 64 applies no error-control or compensating signal via lead 65 to the phase-shifting network 33.

Figure 4:
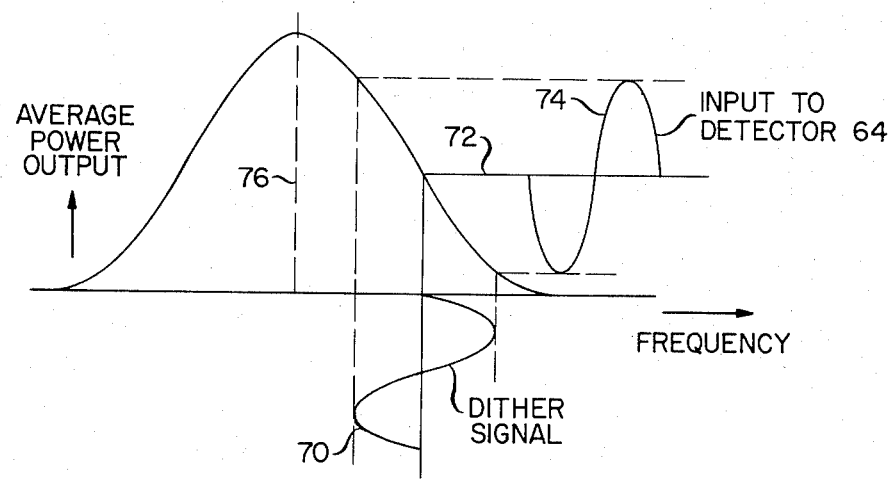

Assume, however, that for some reason, for example a cavity length change, the phase shift around the main feedback loop of the FIG. 1 arrangement no longer exactly equals an integral multiple of 360°. Specifically, assume that the relative phase conditions become such that the dither signal introduced into the main feedback loop is displaced from the centerline of the aforedescribed power-frequency curve. In particular, assume a displacement as shown in FIG. 4. The projection of dither signal 70 onto axis 72 provides a signal 74 at the same frequency as the dither signal. The amplitude of this signal is a function of the displacement of the dither signal 70 from centerline 76 and the phase of the signal is a function of whether the displacement is to the right or left of the centerline 76. (Equal displacements to the right and left of the centerline 76 would provide equal-amplitude signals 180° out of phase with each other.)

The signal component 74 represented in FIG. 4 is included in the laser signals that are directed at the photodetector 28 (FIG. 1) by the beam splitter 24. The detector 28 and the amplifier 62 extract this signal component from the laser output and apply it to the phase-sensitive detector 64. In the detector 64 the extracted signal is compared with the reference dither signal provided by the generator 60. In turn the detector 64 provides a dc output signal whose polarity is representative of whether the extracted signal is in phase or out of phase with the reference dither signal. A negative dc output, for example, indicates that a phase deviation of the type represented in FIG. 4 has occurred. On the other hand a positive dc output signal indicates a relative phase condition wherein the dither signal occurs to the left of the centerline 76 (FIG. 4). Moreover, the amplitude of the dc output of the detector 64 is representative of the amount of the phase deviation from the initially established phase condition.

Accordingly, the output of the detector 64 shown in FIG. 1 is determined by the direction and extent to which the phase shift in the main feedback loop deviates from being an integral multiple of 360°. Thus, by applying this output signal to the network 33, the phase shift in the main loop is automatically readjusted to establish the condition represented in FIG. 3. When that midpoint condition is reached, the output of the phase-sensitive detector 64 falls to zero. No further correction signals are then applied to the network 33 by the detector 64 until another perturbation-caused phase deviation occurs.

Thus the auxiliary feedback loop comprising the units 28, 62 and 64 shown in FIG. 1 is effective to stabilize the depicted mode-locked laser arrangement by maintaining the arrangement at or near the midpoint of the range in which mode-locked behavior occurs.

In accordance with the principles of the present invention, a mode-locked laser having a main feedback loop of the servo type can also be stabilized by adding an auxiliary error-control loop thereto. Such a combination is shown in FIG. 2.

Figure 2:
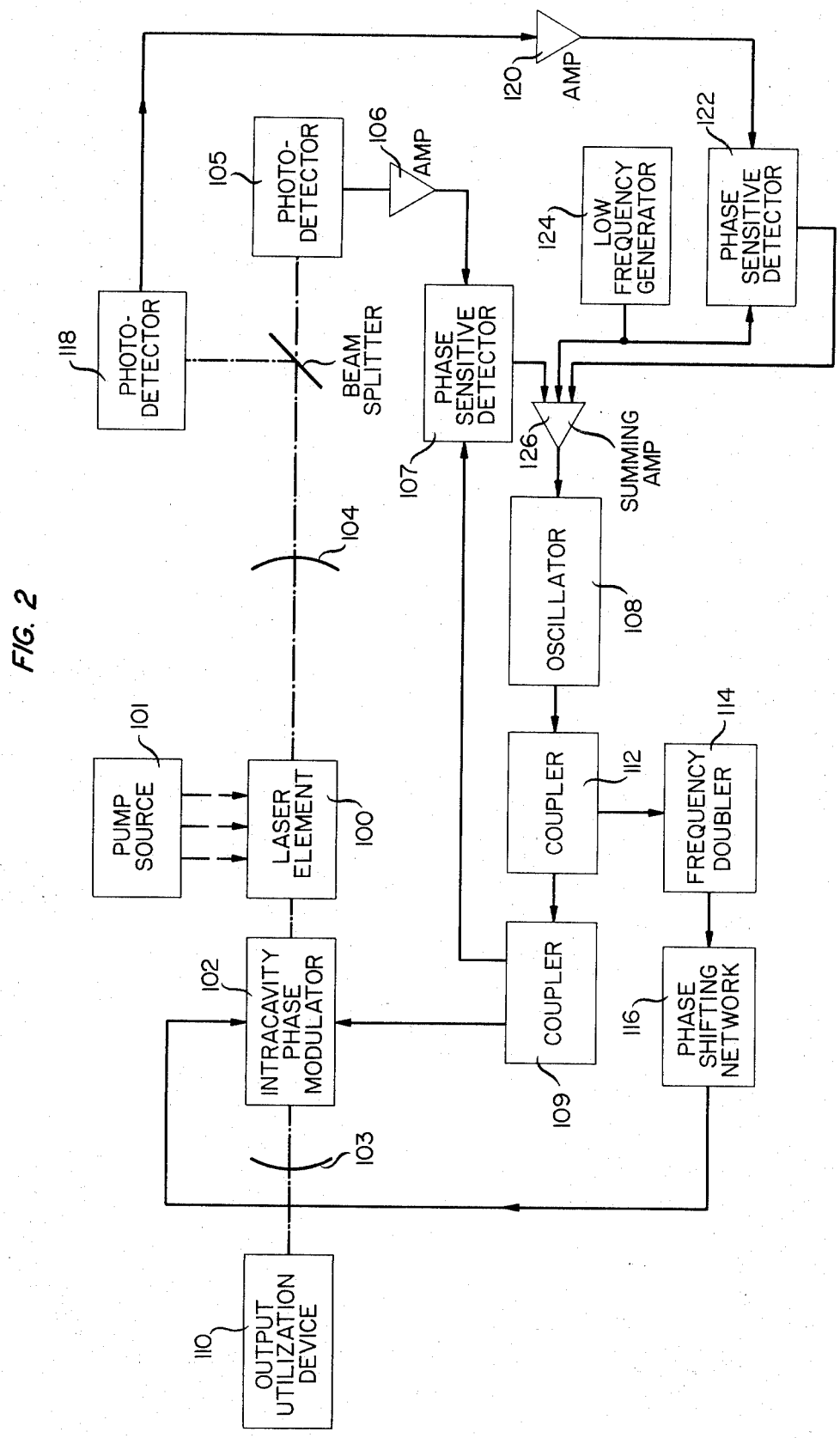

In FIG. 2 reference numerals 100 through 110 designate the units which constitute a conventional feedback-stabilized mode-locked laser of the servo type. In accordance with known techniques the intracavity phase modulator 102 of such a laser is driven via a main feedback loop at the average mode-spacing frequency. In addition by means of coupler 112, frequency doubler 114 and phase-shifting network 116, the modulator 102 is driven simultaneously at the second harmonic of the mode-spacing frequency, thereby to eliminate the randomly-fluctuating 180° phase-unstable output that is characteristic of some lasers. (As noted above, this technique for eliminating the phase-unstable output is described in the aforecited Seidel application.)

Moreover, in accordance with the principles of the present invention, the mode-locked arrangement shown in FIG. 2 includes an auxiliary feedback loop for achieving automatic long-term stability of the arrangement. The auxiliary loop includes photodetector 118, amplifier 120, phase-sensitive detector 122, low frequency generator 124 and summing amplifier 126. In the same manner specified above in connection with the description of FIG. 1, the detector 122 provides an error-control signal for application to the main feedback loop. In particular, the output of the detector 122 is applied via the summing amplifier 126 to a voltage-controlled variable-frequency oscillator 108. Accordingly the frequency of the oscillator 108 is automatically adjusted whenever perturbations in the system cause the modulating signals and the laser output signals to tend to fall out of synchronism. In this way the system is maintained at or near the initially-established midpoint of a range of error signal values in which mode-locked operation can occur.

Additionally, the error signal appearing at the output of the phase1sensitive detector 122 may be used to return the length of the laser cavity to its original value by means of known piezoelectric devices.

It is to be understood that the above-described arrangements are only illustrative of the application of the principles of the present invention. In accordance with these principles, numerous other arrangements may be devised by those skilled in the art without departing from the spirit and scope of the invention.

What is claimed is:

1. In combination,
a multi-axial-mode laser comprising
   a cavity,
   and a modulator positioned within said cavity;
a main feedback loop comprising
means for extracting a signal from said laser cavity at the frequency that corresponds to the average axial-mode spacing of the laser,
   and means for processing said first-mentioned signal to drive said modulator in the phase-locked region of operation of said laser to achieve mode-locked operation, said main feedback loop also including a signal-controlled variable element;
and an auxiliary feedback loop comprising
   means for extracting a signal from said laser cavity at a frequency that is low relative to the frequency of said first-mentioned signal,
   means for applying said second-mentioned signal to said variable element,
   and generating means for applying signals at said second-mentioned frequency to said means for processing and to said means for applying.

2. In combination,
a multi-axial-mode laser comprising
   a cavity,
   and a modulator positioned within said cavity;
a main feedback loop comprising
   means for extracting a signal from said laser cavity at the frequency that corresponds to the average axial-mode spacing of the laser,
   and means for applying said extracted signal to said modulator to drive said laser at or near the average mode-spacing frequency in the phase-locked region of operation of said laser to achieve mode-locked operation;
a dither signal generator for applying a low frequency signal to said main loop;
and an auxiliary feedback loop comprising
   means for extracting from said laser cavity any dither signal component in the laser output,
   and means responsive to said extracted dither signal component and to the output of said dither signal generator for applying a compensating signal to said main loop to maintain said laser, despite the occurrence of perturbations in said combination, at or near the midpoint of the operating range in which mode-locking occurs.

3. A combination as in claim 2 further including means responsive to said means for extracting a signal from said cavity at the frequency that corresponds to the average axial-mode spacing of the laser for doubling said average mode-spacing frequency, and means for applying signals at said doubled frequency to said modulator simultaneously with the application to said modulator of signals at said average mode-spacing frequency.

4. A combination as in claim 3 wherein said means for applying a compensating signal to said main loop comprises a phase-sensitive detector.

5. A combination as in claim 4 wherein said main feedback loop is of the oscillator type.

6. A combination as in claim 5 wherein said compensating signal is applied to a phase-shifting network included in said oscillator-type feedback loop.

7. A combination as in claim 4 wherein said main feedback loop is of the servo type.

8. A combination as in claim 7 wherein said compensating signal is applied to a summing amplifier included in said servo-type feedback loop.

9. In combination,
a multi-axial-mode laser comprising
    a cavity,
    and a modulator positioned within said cavity;
a feedback loop comprising
    means for extracting a signal from said laser cavity at the frequency that corresponds to the average axial-mode spacing of the laser,
    and means for applying said extracted signal to said modulator to drive said laser at or near the average mode-spacing frequency in the phase-locked region of operation of said laser to achieve mode-locked operation;
means responsive to said means for extracting a signal from said cavity at the frequency that corresponds to the average axial-mode spacing of the laser for doubling said frequency;
and means for applying signals at said doubled frequency to said modulator simultaneously with the application to said modulator of signals at said average mode-spacing frequency.

* * * * *